(12) United States Patent
Kartashov et al.

(10) Patent No.: US 12,504,649 B2
(45) Date of Patent: Dec. 23, 2025

(54) SPECTACLES WITH SANDWICHED POLYMER STRUCTURE

(71) Applicant: Polight ASA, Tønsberg (NO)

(72) Inventors: Vladimir Kartashov, Horten (NO); Lars Henriksen, Tønsberg (NO); Pierre Craen, Embourg (BE); Janne Tapani Kilpinen, Akaa (FI)

(73) Assignee: Polight ASA, Tønsberg (NO)

( * ) Notice: Subject to any disclaimer, the term of this patent is extended or adjusted under 35 U.S.C. 154(b) by 703 days.

(21) Appl. No.: 17/628,359

(22) PCT Filed: Aug. 6, 2020

(86) PCT No.: PCT/EP2020/072130
§ 371 (c)(1),
(2) Date: Jan. 19, 2022

(87) PCT Pub. No.: WO2021/023815
PCT Pub. Date: Feb. 11, 2021

(65) Prior Publication Data
US 2022/0260856 A1    Aug. 18, 2022

(30) Foreign Application Priority Data
Aug. 7, 2019 (EP) .................................. 19190462

(51) Int. Cl.
*G02C 7/00* (2006.01)
*G02C 7/02* (2006.01)
*G02C 7/08* (2006.01)

(52) U.S. Cl.
CPC .................................. *G02C 7/081* (2013.01)

(58) Field of Classification Search
CPC ....... G02F 1/0136; G02B 26/001; G02B 3/12; G02C 7/00; G02C 7/06; G02C 7/02; G02C 7/024; A61F 9/026; B24B 9/14
(Continued)

(56) References Cited

U.S. PATENT DOCUMENTS 6,318,857 B1    11/2001    Shirayanagi
8,366,002 B2 *   2/2013    Wang ..................... G02B 3/14
                                                        235/462.49
(Continued)

FOREIGN PATENT DOCUMENTS

CN    1650218 A    8/2005
CN    109564358 A    4/2019
(Continued)

OTHER PUBLICATIONS

Office Action for CN 202080056156.5 issued Nov. 21, 2023.
(Continued)

*Primary Examiner* — Dawayne Pinkney
(74) *Attorney, Agent, or Firm* — KNOBBE, MARTENS, OLSON & BEAR, LLP (57) ABSTRACT

The invention relates to a spectacle lens comprising a first transparent cover member, a second transparent cover member wherein the first cover member comprises a proximal surface arranged to face the eye and the second cover member comprises a distal surface arranged to face the surroundings when in use, one or more actuators arranged to generate forces or torques on the first or the second cover member along a circumference of the first or the second cover member so as to generate a controllable change of curvature of the first or the second cover member, a transparent, deformable, non-fluid body sandwiched between the first and second transparent cover members.

17 Claims, 6 Drawing Sheets

(58) Field of Classification Search
USPC ........ 351/159.4, 41, 159.01, 159.39, 159.42, 351/159.68, 159.74–159.77, 178; 359/245–247, 665–666
See application file for complete search history.

(56) References Cited

U.S. PATENT DOCUMENTS

| | | | |
|---|---|---|---|
| 9,874,664 B2 * | 1/2018 | Stevens | G02C 7/083 |
| 2008/0144185 A1 * | 6/2008 | Wang | G02B 3/14 |
| | | | 235/472.01 |
| 2010/0118414 A1 * | 5/2010 | Bolis | G02B 3/14 |
| | | | 359/666 |
| 2010/0232161 A1 * | 9/2010 | Aschwanden | H04N 23/55 |
| | | | 359/666 |
| 2012/0140167 A1 | 6/2012 | Blum | |
| 2015/0116656 A1 * | 4/2015 | Stevens | G02B 3/14 |
| | | | 359/666 |
| 2019/0011612 A1 | 1/2019 | Mastrangelo et al. | |
| 2021/0026045 A1 * | 1/2021 | Jacoby | G02C 7/085 |

FOREIGN PATENT DOCUMENTS

| | | |
|---|---|---|
| WO | WO 95/27912 A1 | 10/1995 |
| WO | WO 2008/035983 A1 | 3/2008 |
| WO | WO 2008/100154 A1 | 8/2008 |
| WO | WO 2013/144533 A1 | 10/2013 |
| WO | WO 2019/002448 A1 | 1/2019 |

OTHER PUBLICATIONS

International Search Report for PCT/EP2020/072130 dated Nov. 13, 2020.

International Preliminary Report on Patentability for PCT/EP2020/072130 dated Nov. 25, 2021.

* cited by examiner

SPECTACLES WITH SANDWICHED POLYMER STRUCTURE

CROSS REFERENCE TO RELATED APPLICATIONS

This application is a U.S. National Phase Application of PCT International Application Number PCT/EP2020/072130, filed on Aug. 6, 2020, designating the United States of America and published in the English language, which is an International Application of and claims the benefit of priority to European Patent Application No. 19190462.2, filed on Aug. 7, 2019. The disclosures of the above-referenced applications are hereby expressly incorporated by reference in their entireties.

FIELD OF THE INVENTION

The invention relates to spectacles, particularly spectacles configured with lenses of which the optical power is adjustable.

BACKGROUND OF THE INVENTION

The capability of the eye to focus on objects at different distances may be limited of different reasons. Typically, this capability is reduced as a function of age. Then it may be necessary to use different spectacles having different optical powers, or spectacles with different or variable optical powers like bifocal or progressive spectacles.

Although these solutions are of great benefit, the need for switching between different spectacles or using spectacles with different built-in optical powers are not optimal as compared with the sight of a person with non-degraded focusing capabilities.

Accordingly, it is an object to improve spectacles with respect to the above mentioned problems and other limitations of presently available spectacles.

SUMMARY OF THE INVENTION

It is an object of the invention to improve spectacles, particularly to provide spectacles which provides different optical powers in a more user-friendly way than traditional spectacles. It is also an object of the invention to further improve the sight of a person with degraded focusing capabilities or which suffers from other sight limitations as compared with presently available spectacles.

In a first aspect of the invention there is provided a spectacle lens which comprises
 a first transparent cover member,
 a second transparent cover member, wherein the first cover member comprises a proximal surface arranged to face the eye and the second cover member comprises a distal surface arranged to face the surroundings when in use,
 one or more actuators arranged to generate forces or torques on the first or the second cover member so as to generate a controllable change of curvature of the first or the second cover member, and
 a transparent, deformable, non-fluid body sandwiched between the first and second transparent cover members, wherein
 the one of the first and second transparent cover member on which the one or more actuators act, is supported on the distal surface or the proximal surface, respectively, by a sliding contact (304) which allows a displacement of the distal surface or the proximal surface relative to the one or more actuators (160).

Advantageously, the controllable actuators enables control of the optical power of the lenses in a pair of spectacles implying that the optical power of the lenses can be changed without the user needs to gaze through different portions of the lenses to access different optical powers as in traditional multi-focal or progressive lenses.

Advantageously the transparent, deformable, non-fluid body supports the bending of the first or second cover member so that the resulting curvature of the bending approximates a spherical shape. That is, polymers which are used for the non-fluid body creates a non-uniform distribution of the force applied to the cover members when actuators are activated. In comparison, the hydrostatic pressure in liquid is the same everywhere in liquid. A non-uniform force distribution can be advantageous in some situations to create a spherical deformation profile.

Further, the non-fluid body is not significantly sensitive to gravity as compared with liquid. Thus, optical errors due to gravity effects is limited due to use of the non-fluid body.

The one or more actuators may be arranged to generate the forces or torques on the first or the second cover member along a path which surrounds at least a portion of the non-fluid body such as a along a circumference of the first or the second cover member so as to generate a controllable change of curvature of the first or the second cover member.

The sliding contact arranged to allow displacement of the distal surface or the proximal surface relative to the one or more actuators is optional and may be omitted in other configurations.

According to an embodiment, the proximal surface and/or the distal surface are inwardly curved when seen from the eye.

According to an embodiment, the one of the first and second transparent cover member on which the one or more actuators act, is bendable by the generated forces or torques of the one or more actuators, and the other of the first and second transparent cover member is shaped to provide a static optical correction.

According to an embodiment, the one of the first and second transparent cover member on which the one or more actuators act, is supported on the distal surface or the proximal surface, respectively, by a sliding contact which allows a displacement of the distal surface or the proximal surface along the surface relative to the actuator.

According to an embodiment, the spectacle lens is arranged so that the non-fluid body is able to expand unconstrained in an annular volume located between the first and second transparent cover members and surrounding the non-fluid body.

According to an embodiment, the spectacle lens is arranged so that light from the exterior travelling through the spectacle lens towards an eye is refracted through a sandwich structure consisting of the first and second transparent cover members and the non-fluid body, optionally including optical coatings on the distal surfaces of the first and second transparent cover members. Advantageously, the simple design of the spectacle lens provides a solution few components.

According to an embodiment, at least one of the first and second transparent cover members has an initial curved shape so that the spectacle lens has a non-zero optical power when the one or more actuators provide a zero or minimum force on the first or second cover member.

According to an embodiment, at least one of the first and second transparent cover members has a concave or convex shaped portion abutting the non-fluid body.

According to an embodiment, the one or more actuators are controllable to generate at least two predetermined optical powers of the spectacle lens.

According to an embodiment, the spectacle lens is optimized to generate minimum optical errors at the at least two predetermined optical powers.

According to an embodiment, the one or more actuators are controlled via a control or power signal, where the control or power signal is determined as a function of measured data.

According to an embodiment, the one or more actuators are controlled via a control signal, where the control signal is determined as a function of an error between a desired optical power of the spectacle lens and measured data relating to the actual optical power.

According to an embodiment, the actuators are linear displacement motors capable of maintaining an achieved curvature of the first or the second transparent cover member in a non-powered state.

According to an embodiment, a minimum diameter of a line extending from one edge to an opposite edge and crossing a center point of the spectacle lens is 15 mm.

According to an embodiment, the sliding contact comprises one or more elastic elements connecting the one or more actuators with the distal surface and/or the proximal surface.

A second aspect of the invention relates to a spectacle comprising
at least one spectacle lens according to the first aspect, and
a power and control circuit for powering and controlling the one or more actuators.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENT

Figure 1:
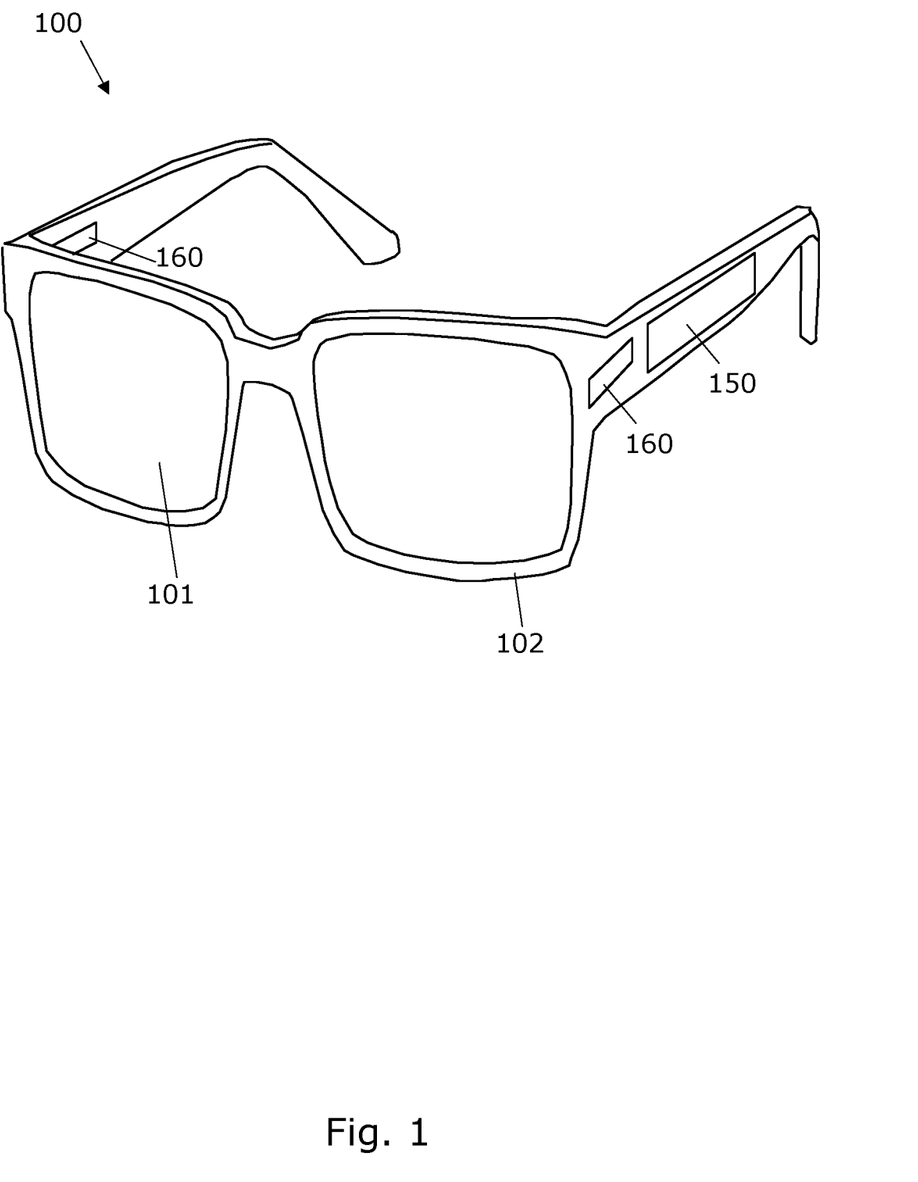
FIG. 1 shows a pair of spectacles.

FIG. 1 shows a pair of spectacles 100 comprising two spectacle lenses 101 mounted in a spectacle frame 102. The pair of spectacles 100 further comprises a power and control circuit 150, which may be integrated in the frame 102, for powering and controlling one or more actuators 160 arranged to generate forces acting on one or more of the lenses 101 in order to generate a controllable change of the optical power of the lenses 101. The power and control circuit 150 and the actuators 160 are principally illustrated.

Figure 2A:
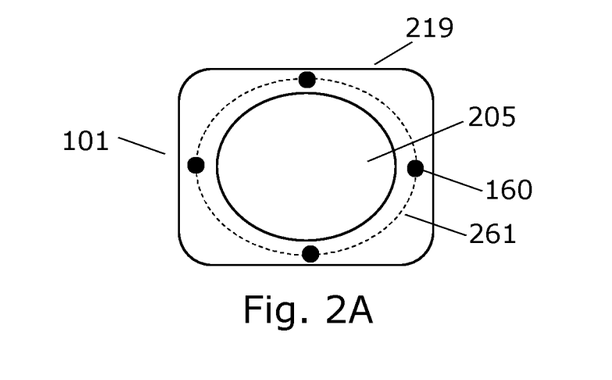
FIGS. 2A-2B show a front view of one of the spectacle lenses and a side view of the lens.
Figure 2B:
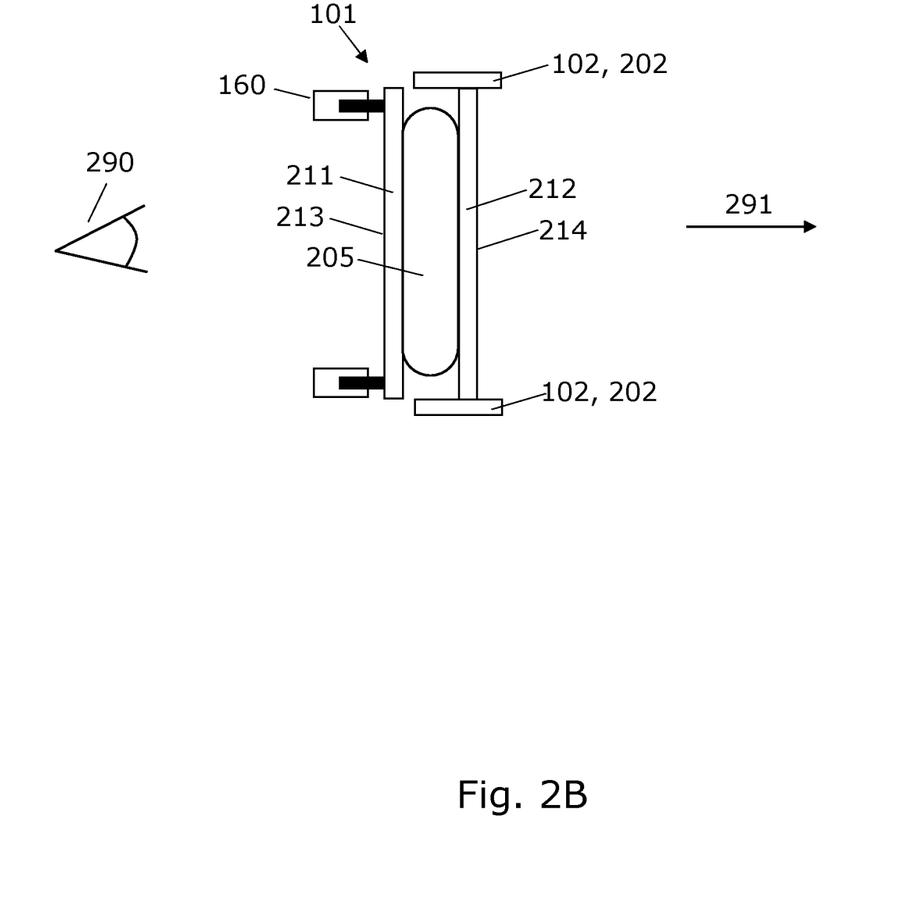

FIG. 2A shows a front view of one of the spectacle lenses 101, and FIG. 2B shows a side view or cross-sectional view of the lens 101.

The lens comprises a first transparent cover member 211, and a second transparent cover member 212. The first transparent cover member 211 is defined as the cover member which is located next to the eye 290, when in use. Accordingly, the second cover member 212 is defined as the cover member which is located nearest the surroundings, i.e. the object space, when in use.

The outwardly facing surface of the first transparent cover member 211 is defined as a proximal surface 213 which faces the eye 290 when in use. The outwardly facing surface of the second transparent cover member 211 is defined as a distal surface 214 which faces the surroundings when in use.

The lens 101 comprises a transparent, deformable, non-fluid body 205 sandwiched between the first and second transparent cover members 211, 212. The non-fluid body 205 abuts the inwardly facing surfaces of the first and second cover members 211, 212.

The one or more actuators 160 are arranged to generate forces or torques on the first or the second cover member 211, 212 along a circumference 261 of the first or the second cover member.

For example, the actuators 160 may be linear displacement actuators, such as linear piezoelectric motors, arranged to apply a displacement at several points, here four points are illustrated, along the circumference 261.

The circumference 261 may located outside the transparent, deformable, non-fluid body 205 so that the non-fluid body 205 is surrounded by the circumference as illustrated. However, the circumference 261 could also be located within the extension of the non-fluid body 205. The actuators 160 could also be located so that they act on the edge 219 of the first or second cover member 211, 212.

Thus, the circumference 261 is understood as a path which surrounds at least a portion of the non-fluid body, such as a portion which comprises the optical axis 291 or a center portion of the non-fluid body.

Other configurations where the actuators act on a frame or mount that transfer the force to the lenses 101 are also possible. In this case the force or torque from a single actuator could be distributed to the cover members 211, 212. The frame or mount could covert rotation of a rotational actuator into linear displacement.

The actuators 160 are arranged to generate the displacement along the circumference 261 in a direction normal or substantially normal to one of the surfaces, e.g. the proximal or distal surface 213, 214. Substantially normal, in this context, may imply deviations relative to the normal by up to e.g. 10-15 degrees. Other configurations where the actuators act on the edge 219, e.g. an actuator comprising a tightening belt which at least partly circumscribes the edge 219, are also possible. Thus, in such other configurations the actuators may be arranged to generate forces acting in the plane of the cover member 211, 212.

The action of the actuators, as described in more detail below, changes the curvature of the first or the second cover member dependent on the force, torque or displacement provided by the actuators. Thus, by controlling the actuators, the bending and thereby the optical power of the lens 101 can be controlled.

In order to enable the bending of the first or second membrane 211, 212, the one of the first and second membrane which is not in contact with the actuators 160, may be supported by a portion of the spectacles frame 202, i.e. so that the this first or second membrane is fixed to the frame 102.

The example of FIG. 2B shows that the second membrane 212 is fixed to the frame 102, 202 and that the first membrane 211 is connected to the one or more actuators 160. In another example, the first membrane 211 is fixed to the frame 102, 202 and the second membrane 212 is connected to the one or more actuators 160.

It is also possible that the actuators are arranged to act on both the first and second membranes 211, 212 so that both membranes are forced to bend by the action of the actuators 160, possibly so that actuators on either side are controllable independently, i.e. so that the displacement/force applied on one of the cover members is independent of the displacement/force applied on the other.

Figure 5A:
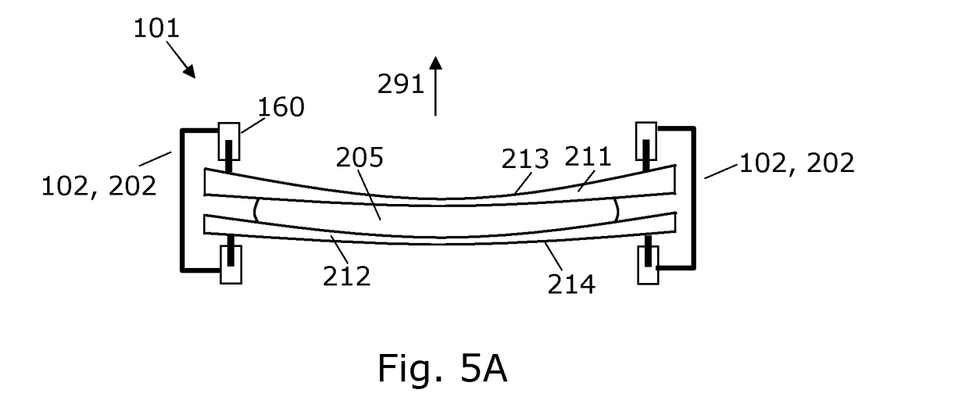
FIGS. 5A-5B illustrates alternative configurations of the actuators, FIG. 6A principally illustrates another configuration of the sliding contact, and FIG. 6B principally illustrates an elastic element of the sliding contact.

An example of such a solution is illustrated in FIG. 5A, where the actuators are fixed to the frame 120, 202 of the spectacles and the cover members 211, 212 are fixed to the actuators.

Figure 5B:
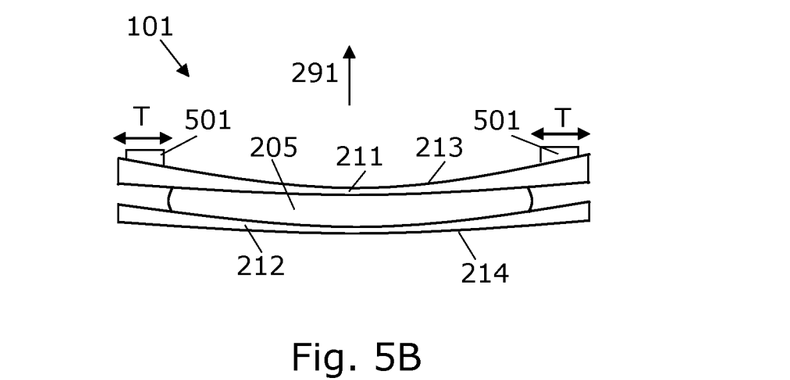

FIG. 5B illustrates another actuator 160 embodied by one or more elements 501 arranged along the circumference 261. For example, the actuator 160 may be embodied by a ring shaped actuator element 501 such as a ring shaped piezo element which is attached to the proximal and/or the distal surfaces 213, 214 of the first and/or second cover member 211, 212.

The actuator 160 in the form of a ring shaped actuator such as a ring shaped piezoelectric element 501, or a distribution of individual surface mounted elements 501, is arranged centered at the optical axis 291 so that interior of the ring element 501 or distribution of elements 501 along the circumference 261 allows transmission of light. By supplying power signal to the elements 501, the elements contracts or expands radially (e.g. in a plane perpendicular to the optical axis 291), essentially rotation symmetric relative to the optical axis 291. The generated contractile or expansive forces T are transferred to the cover members 211, 212 and cause bending due to the torques generated by the forces T. The lenses 101 in FIG. 5B, may be connected to the frame via the elements 501 as in FIG. 5A, e.g. when both of the cover members comprise elements 501, or via the cover member as in FIG. 3B when this cover member does not have elements 501.

Figure 3A:
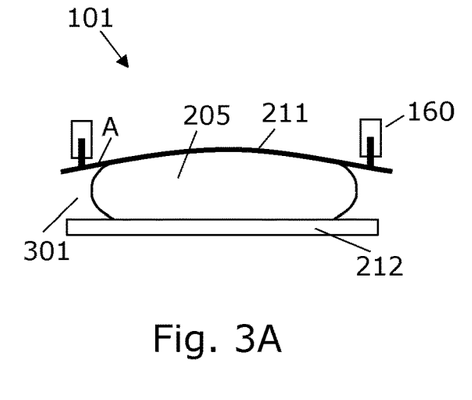
FIGS. 3A-3B illustrates the principle of controlling the curvature of one of the first or the second cover members.
Figure 3B:
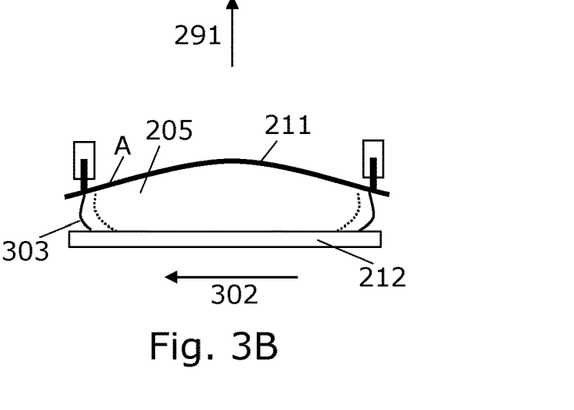
Figure 3C:
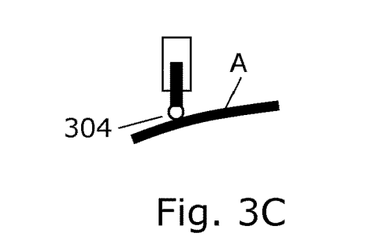
FIG. 3C illustrates a sliding contact.
Figure 3D:
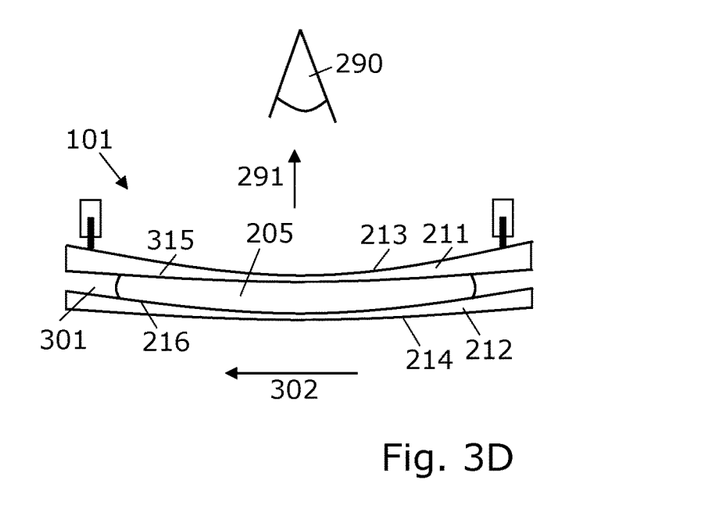
FIG. 3D illustrates an example where the first transparent cover member and the second transparent cover member are inwardly curved.
Figure 3E:
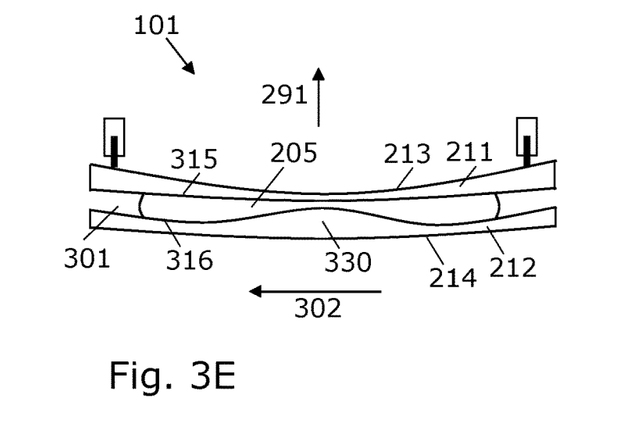
FIG. 3E illustrates an example where one of the first and second transparent covers has a convex portion.

The components of FIGS. 5A and 5B, are described in more detail in FIGS. 3D-E.

The lens 101 defines an optical axis 291. The optical axis can be seen as the axis that light propagates along from the object space towards the eye 290, at least for some paraxial light rays. The plane or curved surfaces of the first and second transparent membranes 211, 212, such as the plane or curved proximal/distal surfaces 213, 214, may—on at least one surface point—define a plane or tangent plane which is normal to the optical axis 291, or at least define a plane or tangent plane which makes an acute angle with a plane which is normal to the optical axis 291. Thus, the planes of the first and second transparent membranes 211, 212 generally extends along a direction perpendicular to the optical axis 291. The transparent deformable, non-fluid lens body 205 is preferably made from an elastic material. Since the lens body is non-fluid, no fluid-tight enclosure is needed to hold the lens body, and there is no risk of leakage. In a preferred embodiment, the lens body is made from a soft polymer, which may include a number of different materials, such as silicone, polymer gels, a polymer network of cross-linked or partly cross-linked polymers, and a miscible oil or combination of oils. The elastic modulus of the non-fluid lens body may be larger than 300 Pa, thereby avoiding deformation due to gravitational forces in normal operation. The refractive index of the non-fluid lens body may be larger than 1.3. The non-fluid body 205 may have a refractive index which is equal, substantially equal or close to the refractive index of the transparent cover members 211, 212 in order to reduce reflections at the boundaries of the non-fluid body 205.

The transparent cover members 211, 212 may be made from a large number of different materials, such as acrylics, polyolefins, polyesters, silicones, polyurethanes, glass and others. At least the one of the first and second cover members 211, 212 which is arranged to be deformed by the actuators, has a stiffness and thickness suitable to enable bending by actuation of the actuators 160. In general, the material of the first and/or the second cover member 211, 212 may be formed in a material having a Young's modulus in the range between MPa and 100 GPa to provide the necessary stiffness. For example, Young's modulus for borosilicate glass is 63 GPa, and 72 GPa for fused silica glass.

The bending of the first and/or second cover members 211, 212 is at least partly due to radially varying reaction forces from the non-fluid lens body 105 which affects the Sag of the cover members 111, 112 and thus the optical power instead of just vertically compressing the lens body with no change in Sag. A full explanation of the effect of the lens body 105 on the curvature of the cover members is described in WO2019002524A1 hereby incorporated by reference. The material of the non-fluid lens body 105 is substantially incompressible. This incompressibility is at least partly responsible for the capability of bending the first and/or second cover members 211, 212 in a shape which provides the effect of an optical lens.

Like traditional spectacle lenses, the lens 101 may comprise coatings such as anti-reflection coatings applied on the proximal surface 213 and/or the distal surface 214.

The transparent cover members 211, 212 are generally slab-shaped and may have curved or plane surfaces or a combination thereof. The slab-shaped cover members comprises first and second surfaces, e.g. the distal surface 214 and the inner surface 216, and an edge, where the curvature extends along at least one direction on at least one of the surfaces. Thus, the transparent cover members 211, 212 may be curved along only one direction or along two directions. Alternatively, one or both of the first and second surfaces may be plane. For example, one or both of the cover members 211, 212 may constitute a plano-convex or plano-concave lens.

The thickness of the cover member which is arranged to be bend by the actuators may be in the range from 0.1 mm to 2 mm or up to 10 mm although other thicknesses are also possible.

The spectacle lenses 101 may have a minimum diameter defined by a line extending from one edge to an opposite edge and crossing a center point of the spectacle lens of 15 mm. I.e. the minimum diameter of the lenses 101 are generally larger than 15 mm. Typical diameters of lenses 101 are in the range from 20 to 50 mm.

FIGS. 3A and 3B illustrates the principle of controlling the curvature of one of the first or the second cover members 211, 212. In FIG. 3A, the first cover member 211 has a curved surface implying that the lens can generate a non-zero optical power.

The deformations and expansions shown in FIGS. 3A-3C are largely exaggerated. Furthermore, the first cover member 211 is illustrated with an outwardly curved bending (see from the eye side), whereas an inwardly curved shape would be more typical. However, both outwardly and inwardly curved bending shaped are feasible for different sight corrections.

The curvature of the first cover member 211 in FIG. 3A may be due to the forces provided by the actuators 160. Alternatively, the curvature of the first cover member 211, may be a pre-shaped curvature. Thus, the first cover member 211 may have an initial curvature, i.e. a curvature present in the absence of actuator forces, implying that the spectacle lens 101 has a non-zero optical power when the one or more actuators provides a zero or minimum force on the first cover member 211, or the second cover member 212, e.g. in a non-powered state of the actuators.

FIG. 3B shows a further bending of the first cover member 211 due to a displacement, e.g. in direction of the optical axis, of the actuators 160. The further bending changes the optical power of the lens 101.

Due to the further bending of the first cover member 211 the volume between the first and second membranes 211, 212 reduces implying that the incompressible non-fluid body 205 expands radially away from the optical axis as illustrated in FIG. 3B where the boundary of the non-fluid body 205 has expanded from the boundary indicated with dotted lines to the boundary 303 indicated with solid lines.

The non-fluid body 205 must be able to expand unconstrained, substantially unconstrained or at least with a low resistance, in order not to create deviations of the bending shape from a desired bending shape. Such deviations could result in optical errors such as wavefront aberrations. Accordingly, the spectacle lens 101 may comprise an annular volume 301 located between the first and second transparent cover members 211, 212 and surrounding the non-fluid body wherein the non-fluid body 205 is able to expand unconstrained. The annular volume 301 may be an air-filled volume which may be in direct connection with the surroundings so that air is able to flow freely or substantially freely between the annular volume 301 and the surroundings.

FIG. 3A indicates a point A on the first cover member 211. FIG. 3B shows that the point A has moved to the right relative to the left-side actuator 160 due to the increased bending of the first cover member 211. Accordingly, as the bending of the first or second cover member 211, 212 changes, positions A on the proximal surface 213 or the distal surface 214 translates radially relative to the optical axis 291, e.g. in a direction 302 perpendicular to the optical axis 291 for the illustrated cross-sectional view.

To avoid stresses in the first or second cover member, the spectacle lens 101 comprises a sliding contact 304 as principally illustrated in FIG. 3C. The one of the first and second transparent cover member which is arranged to be bend by the one or more actuators, is supported or mechanically engaged on the distal surface/proximal surface 213,214 by the actuator 160 or the part of the actuator 160 which engages the cover member via the sliding contact 304.

The sliding contact 304 may be embodied by a low friction contact between the actuator 160 and the distal surface/proximal surface 213,214. The low friction contract may be realized by pairs of low friction materials, i.e. the material of the contacting part of the actuator 160 should provide low friction or sufficiently low friction relative to the transparent material of the cover member 211, 212. Examples comprise polyethylene and other plastic materials.

The sliding contact 304 ensures that a given point on the proximal/distal surface 213,214 can be displaced along that surface relative to the contact part of the actuator 160.

The sliding contact 304 is configured to enable displacement of the distal surface 214 or the proximal surface 213 along the surface relative to the part of the actuator 160 which engages said surface. Furthermore, the sliding contact should provide a rigid, i.e. stiff, connection in a direction normal to the surface at the supported location or in a direction of the displacement of the actuator 160 so that actuator displacements are directly transferred to the cover member 211, 212.

Figure 6A:
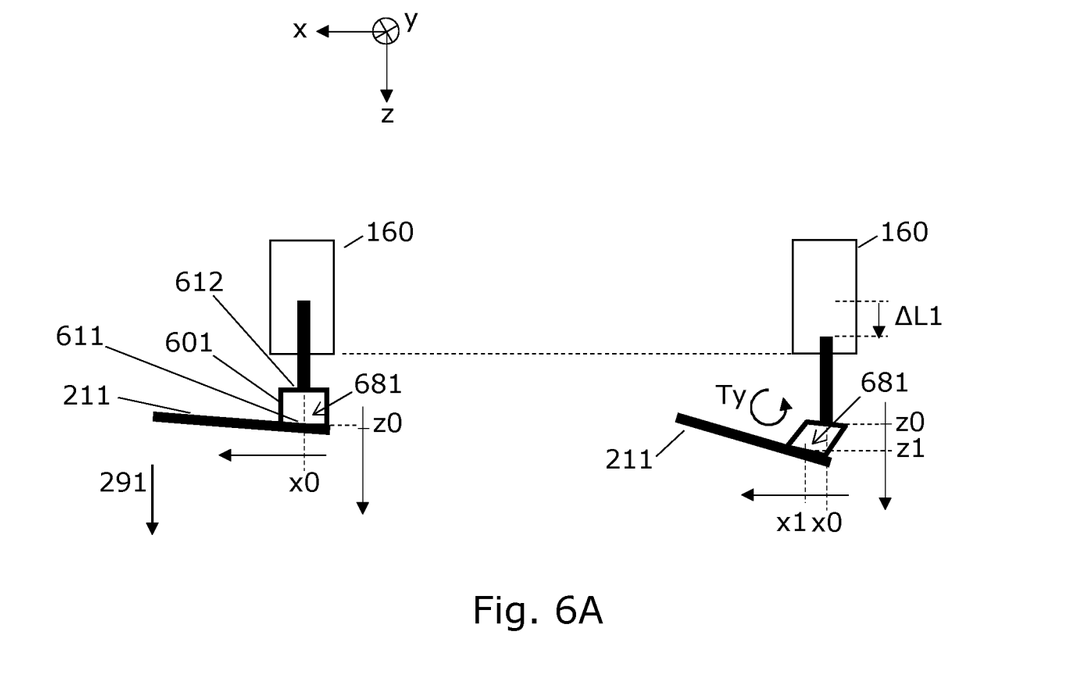

FIG. 6A shows another configuration of the sliding contact 304, wherein the sliding contact 304 is embodied by an elastic element 601 arranged between the actuator 160 and the distal surface/proximal surface 213,214 and connecting the actuator 160 with the distal surface/proximal surface 213,214.

The elastic element 601 is arranged to deform elastically in response to a relative displacement between the actuator 160 and the distal surface/proximal surface 213, 214, such as in response to a radial displacement there between, e.g. a radial translation in the direction 302 perpendicular to the optical axis 291.

The stationary xyz coordinate system is defined relative to an initial location of the elastic element 601, e.g. when the elastic element 601 is in a non-deformed state. In this example, the z axis is parallel with the optical axis 291.

In the illustration to the left, the first transparent cover member 211 (could also have been the second transparent cover member 212) has an initial curvature, which may be due to a pre-shaped curvature or due to an initial displacement. A contact point 681 on the first transparent cover member 211, at the interface between the elastic element 601 and the first transparent cover member 211 has xz coordinates x0,z0.

In the illustration to the right, the actuator 160 has been controlled to move or extend its piston or other displacement element by a distance ΔL1 along the z axis. The displacement generates a bending or additional bending of the first transparent cover member 211 so that the contact point 681 moves from x0,z0 to x1,z1 due a radial displacement of the contact point 681 towards the optical axis and due to a displacement along the z axis.

Due to the bending of the first transparent member 211, the surface at the interface between the elastic element 601 and the first transparent cover member 211 is rotated about the y axis, i.e. in general around an axis which is tangent to the path 261 encircling the optical axis 291.

As illustrated, the elastic element 601 is configured to deform elastically in the radial direction, here shown along the x-axis, in response to the relative radial displacement between the first transparent cover member 211 member and the actuator 160.

Furthermore, the elastic element 130 is configured to deform elastically in response to the torque Ty acting around the y-axis, or the tangent axis. The torque Ty is generated due to the bending of the first transparent cover member 211 which includes a rotation around the y-axis, or in general due to the relative displacement between the first transparent cover member and the actuator displacement element.

Preferably, the elastic element 130 has a low stiffness in response to deformations in the radial direction and in response to rotations such as rotations about the tangent axis being tangent to the path 261, the y axis in this view. A low stiffness is preferred in order to allow the first transparent cover member 211 to bend without being exposed to surface stresses which could affect the curvature of the first transparent cover member 211 inappropriately, so that the modified curvature leads to increased wave front errors or other bending deviations. The undesired stresses would be due to e.g. forces and torques from the elastic element 601 acting in the radial direction and around the tangent axis.

On the other hand, it is preferred that the elastic element has a high stiffness in the direction of displacement of the actuator 150, i.e. along the z-axis or along the optical axis 291, in order to transfer the actuator displacement to the cover member 211, 212.

The elastic element 601 can be defined as a structure which has a first portion 611 (e.g. the surface of the elastic element contacting the cover member 211, 212) fixed to the first or second transparent cover member 211, 212 and a second portion 612 (e.g. the surface contacting the actuator 160) fixed to the actuator 160 or displacement element thereof. The first and second portions 611, 612 are connected elastically so that they are able to displace elastically relative to each other, e.g. in the radial direction to towards the optical axis 291. The elastic element 601 may be monolithically manufactured from an elastic material such as silicon, polymer, metal, plastic and other materials. In an example, the elastic element 601 is formed from an adhesive applied to connect the actuator 160 with the transparent cover member.

Accordingly, the elastic element 601 which embodies the sliding contact 304 enables displacement of the first or second transparent cover member 211, 212, such as the contact point 681, relative to the part of the actuator 160 which engages the cover member, in response to the bending of the cover member.

According to another example, the elastic element 601 is configured as a spring element arranged between the actuator 160 and the distal surface/proximal surface 213,214. For example, the spring element may be configured as a flexure element having relative low stiffness in the radial direction, a relative low rotational stiffness about the tangent axis, but a relative high stiffness along the optical axis.

Figure 6B:
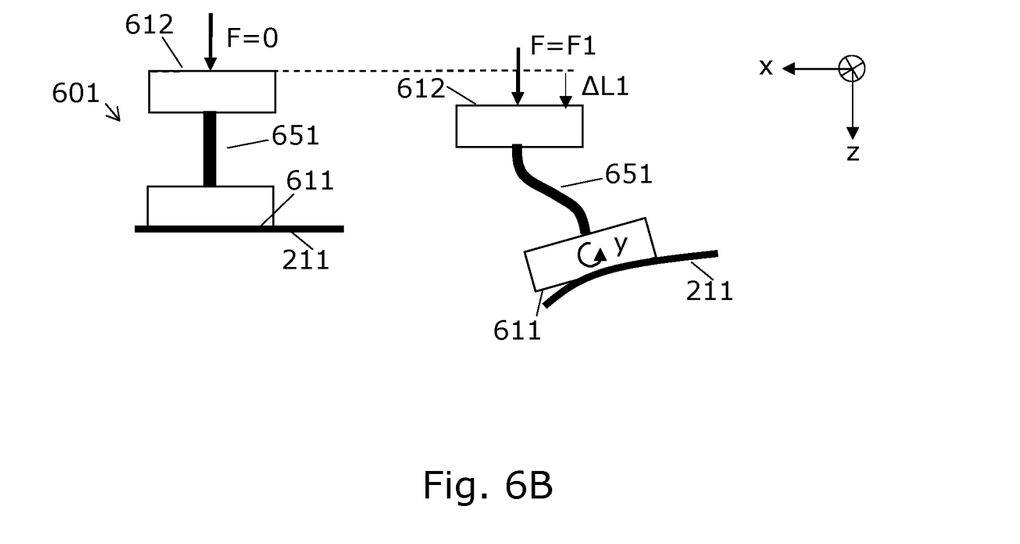

FIG. 6B principally illustrates the elastic element 601 comprising a spring element 651. The illustration to the left illustrates the elastic element 601, or a part of the elastic element, comprising the spring element 651, in a state where the actuator 160 does not generate a force, i.e. F=0. Thus, the first transparent cover member 211 is in a state where its curvature is not changed by the actuators.

In the illustration to the right, the actuator displacement element has been activated to cause a z-axis displacement of ΔL1. The z-axis displacement generates a non-zero equilibrium force F1 (i.e. in the stationary bending state of the cover member) in the z-direction due to the reaction forces caused at least in part by the bending of the first transparent cover member 211. The z-axis displacement generated by the actuator 160 causes the first transparent cover member 211 to bend as exaggeratedly shown. The bending causes, besides the ΔL1 z-axis displacement, a radial displacement of the first portion 611 (here a displacement to the right) along the x-axis and a rotation of the first portion 611 about the y-axis.

It is understood that the sliding element contact 304 may comprise both a spring element 651 and an elastic material, such as an elastic adhesive arranged between the first and/or second portion 611, 612 and the surface of the first or second transparent cover member 211, 212.

Thus, in general, the examples of the sliding element contact 304 embodied by an elastic element 601 and/or by a low friction contact provides the same sliding response to the actuator 160 generated displacement, namely radial displacement of a contact point 681, A (FIG. 6A, FIG. 3C, respectively) and a rotation to support the bending of the first or second cover member 211,212 and transfer of the actuator displacement to the first or second cover member.

In a possible configuration of the first or second cover member 211, 212, the first or second cover member comprises a stiffener element such as stiffener ring (not shown). The stiffener element may be annularly shaped so that it follows the circumference 261 and may e.g. by glued onto the distal/proximal surface 213,214 of the cover member 211, 212. The stiffener element of may be made of a metal or other stiff material. In this configuration, the contact portion of the actuator 160, i.e. the portion arranged to make contact with the cover member 211, 212, will contact the stiffener ring, e.g. via the sliding contact 304. Clearly, the radial extension of the stiffener element should be large enough to accommodate radial translations of the surface of the cover member 211,212 due to bending.

FIG. 3D shows an example where both the proximal surface 213 of the first transparent cover member 211 and the distal surface 214 of the second transparent cover member 212 are inwardly curved (bulges inward or is concave) when seen from the eye. The inwardly curved shape may be preferred for optometrical reasons or to provide an attractive design of the spectacles. It is also possible that only one of the proximal surface 213 of the first transparent cover member 211 and the distal surface 214 of the second transparent cover member 212 are concavely shaped when seen from the eye 290. The inwardly curved shape of the one of the cover members 211,212 which is arranged to be bend by the actuators 160 may be due to a pre-shaping of the cover member. Accordingly, the curvature of inwardly curved shape may be altered by the actuators 160 to provide variable optical power.

FIG. 3D also shows that the curvatures of the proximal surface 213 and the inner surface 315 of the first cover member 211 are different and similarly that the distal surface 214 and the inner surface 316 of the second cover member 211 are different. The different curvatures of a given cover member 211, 212 provides an optical power or optical correction as used in traditional spectacle lenses. It is also possible that only one of the first and second cover members has different curvatures of its surfaces. For example, the one of the first and second transparent cover members 211, 212 which is not arranged to be bend by the actuators may be shaped to provide a static optical correction. The static optical correction may include correction of myopia, hyperopia, astigmatism and others.

FIG. 3E shows an example where the one of the first and second transparent cover members 211, 212 which is not arranged to be bend by the actuators has a convex portion 330, e.g. centered at the optical axis, which forms part of the inner surface 316. The convex portion abuts the non-fluid body 205.

In general, anyone or both of the of the first and second transparent cover members 211, 212 may be configured with concave or a convex shaped portion 330 forming part of the inner surface 316 and abutting the non-fluid body 205. For example, the concavely shaped portion 330 provides a dome shaped feature which advantageously provides mechanical support to the opposite cover member and therefore assists in controlling the bending. The shape of the dome can be designed in such a way that it acts at least partly as a die for the shape of the opposite member cover member. Further, the dome or convex shaped protrusion may enable larger deformation of opposite cover member.

Figure 4A:
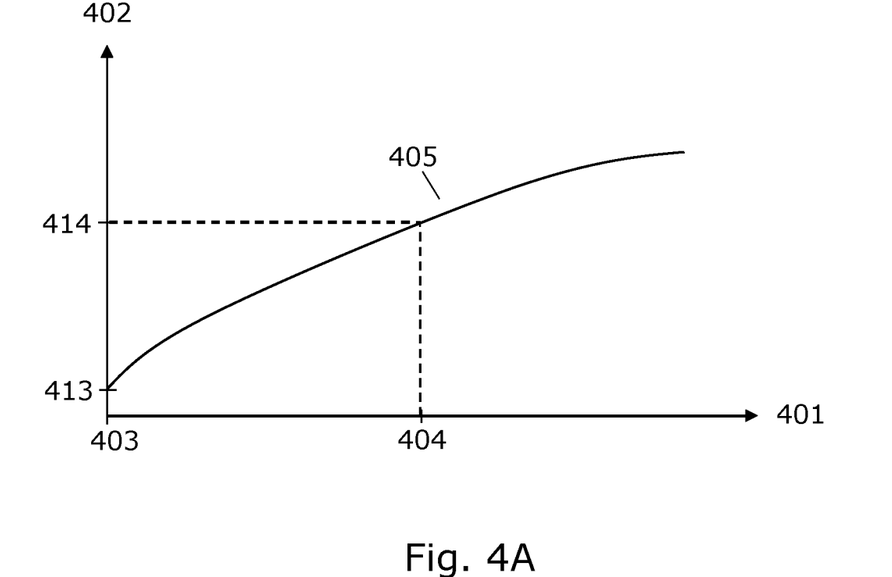
FIGS. 4A-4B illustrates optical power and optical error as a function of a power applied to the actuators.

FIG. 4A principally illustrates a relationship, expressed by the curve 405, between a control or power signal 401 applied to the actuators 160 and the resulting optical power 402. The curve 405 shows that the optical power may be changed continuously from a minimum value to a maximum value. The lenses 101 may be configured to provide a change of up to 3, up to 5 or possibly up to 7 diopters from the minimum optical power to the maximum optical power. Accordingly, the optical power may be continuously adjusted according to the need the eyes of the user.

In other situations, a continuous change of the optical power may not be preferred, e.g. in order to provide spectacles 100 that resembles traditional spectacles. Accordingly, the control system 150 may be configured to shift between predetermined optical powers of the spectacle lenses 101. FIG. 4A shows that the lens 101 can be controlled to provide two predetermined optical powers 413, 414 by controlling the actuators with two values 403, 404 of the control or power signal. The values 403, 404 may be predetermined, determined as a function of other data or determined via a feedback function. Accordingly, the one or more actuators may be controllable to generate at least two predetermined optical powers of the lens 101.

Figure 4B:
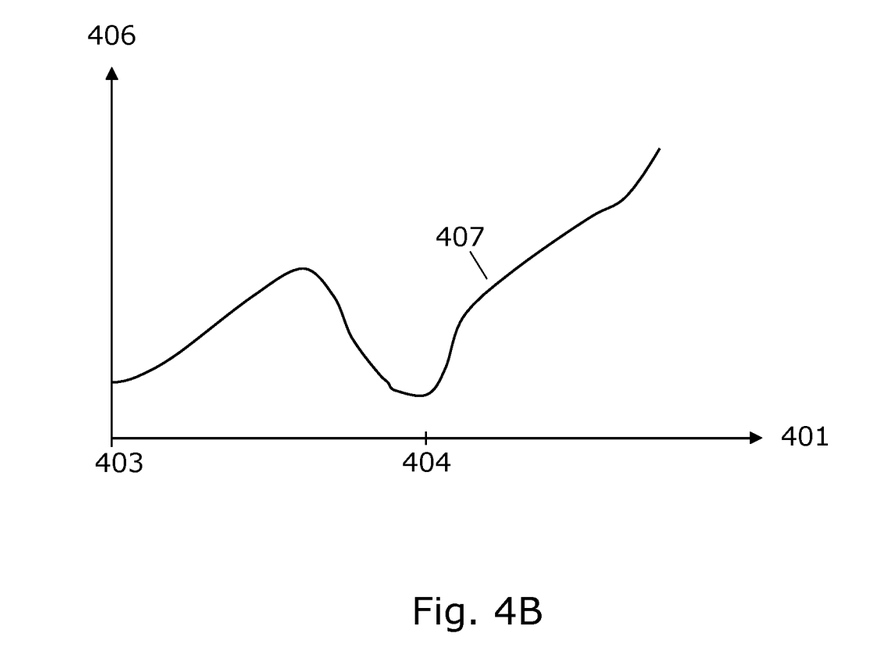

FIG. 4B illustrates an optical error 406 such as a wavefront distortion error or an aberration error, expressed by curve 407, as a function of the control or power signal 401. As illustrated, the optical error 406 is minimized for two values of the control or power signal 401 corresponding to two values of the optical power 402. The optical error 406 may be minimized for two or more optical powers by optimizing the preshaped curvatures of the first and second cover members 211, 212 to provide minimum optical errors at the desired predetermined optical powers 413, 414.

The control or power signal, i.e. a control signal which is indirectly used for controlling the actuators or a power signal directly used for powering the actuators, may be predetermined, i.e. so that a predetermined relationship between one or more values of the control or power signal and corresponding optical powers 402 is used. This relationship may be stored in a memory comprised by the control circuit 150.

Alternatively, since the resulting optical power may depend on various factors such as temperature, history of usage or age of the actuators and others parameters, the control or power signal may be determined as a function of measured data such as measured temperature, measured capacity in case of actuators 160 based on piezoelectric elements, measured change of displacement amplitudes over time and others.

It is possible to configure the spectacles 100 with a distance sensor capable of measuring the distance between the lenses 101 and an object at which the user of the spectacles 100 is gazing. Such sensors may be time-of-flight sensors or other. In this case, the control or power signal may be determined as a function of an error between a desired optical power of the spectacle lens and measured data relating to the desired actual optical power such as the measured distance. Eye-tracking can be implemented in the spectacles to follow gaze direction. Such eye-tracking may be used in combination with the distance sensor to determine what distance should be measured and, therefore, the correctly determine the distance and the relevant optical power.

The actuators 160 may be linear displacement motors such as linear piezoelectric motors or electromagnetic linear motors. Piezoelectric motors may be advantageous since they are capable of maintaining an achieved displacement of the linear output member when power is not supplied to the motor. Thus, the curvature of the first or the second transparent cover member 211, 212 can be maintained in a non-powered state, i.e. when power is not supplied to the motor. This advantageous reduced the power consumption, since power is mainly needed when the optical power is changed.

The control circuit 150 may comprise an electronic circuit and/or a digital processor arranged for generating the control or power signal, optionally for obtaining measured data for determining the control or power signal, and for controlling the actuators using a feedforward or feedback control algorithm.

The invention claimed is:

1. A spectacle lens comprising:
   a first transparent cover member,
   a second transparent cover member, wherein the first transparent cover member comprises a proximal surface arranged to face an eye and the second transparent cover member comprises a distal surface arranged to face surroundings when in use,
   one or more actuators configured to generate forces or torques on the first or the second transparent cover member so as to generate a controllable change of curvature of the first or the second transparent cover member, wherein the actuators are configured to generate a displacement in a direction normal or substantially normal to the proximal surface or the distal surface,
   a transparent, deformable, non-fluid polymer body sandwiched between the first and second transparent cover members, wherein the non-fluid polymer body is a polymer network of cross-linked or partially cross-linked polymers and a miscible oil or combination of oils,
   a sliding contact, wherein:
   the one or more actuators are mechanically engaged with the proximal surface or the distal surface via the sliding contact, wherein the sliding contact is configured to enable displacement of the distal surface or the proximal surface along the distal or proximal surface relative to the actuator and wherein the sliding contact is configured to provide a stiff connection in a direction normal to the proximal or distal surface at the engagement location, or in the direction of the displacement of the actuator, so that the actuator displacement can be directly transferred to the cover member.

2. The spectacle lens according to claim 1, wherein the proximal surface and/or the distal surface are inwardly curved when seen from the eye.

3. The spectacle lens according to claim 1, wherein the one of the first and second transparent cover member on which the one or more actuators act, is bendable by the generated forces of the one or more actuators, and wherein the other of the first and second transparent cover member is shaped to provide a static optical correction.

4. The spectacle lens according to claim 1, wherein the spectacle lens is configured such that the non-fluid polymer body is able to expand unconstrained in an annular volume located between the first and second transparent cover members and surrounding the non-fluid body.

5. The spectacle lens according to claim 1, wherein the spectacle lens is configured such that light from the exterior travelling through the spectacle lens towards an eye is refracted through a sandwich structure consisting of the first and second transparent cover members and the non-fluid polymer body, including optical coatings on the distal surfaces of the first and second transparent cover members.

6. The spectacle lens according to claim 1, wherein at least one of the first and second transparent cover members has an initial curved shape so that the spectacle lens has a non-zero optical power when the one or more actuators provide a zero or minimum force on the first or second cover member.

7. The spectacle lens according to claim 1, wherein at least one of the first and second transparent cover members has a concave or convex shaped portion abutting the non-fluid polymer body.

8. The spectacle lens according to claim 1, wherein the one or more actuators are controllable to generate at least two predetermined optical powers of the spectacle lens.

9. The spectacle lens according to claim 8, wherein the spectacle lens is optimized to generate minimum optical errors at the at least two predetermined optical powers.

10. The spectacle lens according to claim 1, wherein the one or more actuators are controlled via a control or power signal, wherein the control or power signal is determined as a function of measured data.

11. The spectacle lens according to claim 1, wherein the one or more actuators are controlled via a control signal, wherein the control signal is determined as a function of an error between a desired optical power of the spectacle lens and measured data relating to the actual optical power.

12. The spectacle lens according to claim 1, wherein the actuators are linear displacement motors configured to maintain an achieved curvature of the first or the second transparent cover member in a non-powered state.

13. The spectacle lens according to claim 1, wherein a minimum diameter of a line extending from one edge to an opposite edge and crossing a center point of the spectacle lens is 15 mm.

14. The spectacle lens according to claim 1, wherein the sliding contact comprises one or more elastic elements connecting the one or more actuators with the distal surface and/or the proximal surface.

15. A spectacle comprising:
at least one spectacle lens of claim 1, and
a power and control circuit for powering and controlling the one or more actuators.

16. A spectacle lens comprising:
a first transparent cover member,
a second transparent cover member, wherein the first transparent cover member comprises a proximal surface arranged to face an eye and the second transparent cover member comprises a distal surface arranged to face surroundings when in use,
a plurality of separate actuators configured to generate forces or torques on the first or the second transparent cover member so as to generate a controllable change of curvature of the first or the second transparent cover member, wherein the actuators are configured to generate a displacement in a direction normal or substantially normal to the proximal surface or the distal surface, and wherein each of the plurality of actuators are positioned and spaced apart on a circumference encircling at least a portion of the proximal surface or the distal surface
a transparent, deformable, non-fluid polymer body sandwiched between the first and second transparent cover members, wherein the non-fluid polymer body is a polymer network of cross-linked or partially cross-linked polymers and a miscible oil or combination of oils,
a sliding contact, wherein:
the one or more actuators are mechanically engaged with the proximal surface or the distal surface via the sliding contact, wherein the sliding contact is configured to enable displacement of the distal surface or the proximal surface along the distal or proximal surface relative to the actuator and wherein the sliding contact is configured to provide a stiff connection in a direction normal to the proximal or distal surface at the engagement location, or in the direction of the displacement of the actuator, so that the actuator displacement can be directly transferred to the cover member.

17. The spectacle lens according to claim 16, wherein the non-fluid polymer body is a polymer network of cross-linked or partially crossed linked polymers and a miscible oil or combination of oils.

* * * * *